United States Patent
Wang et al.

(10) Patent No.: US 9,038,774 B2
(45) Date of Patent: *May 26, 2015

(54) THERMAL-ACOUSTIC SECTIONS FOR AN AIRCRAFT

(71) Applicant: GULFSTREAM AEROSPACE CORPORATION, Savannah, GA (US)

(72) Inventors: Tongan Wang, Garden City, GA (US); John Maxon, Richmond Hill, GA (US); Andrew Foose, Savannah, GA (US); David Charles Hornick, Midway, GA (US); Josef Fila, Jamestown, NC (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,833

(22) Filed: Dec. 4, 2013

(65) Prior Publication Data
US 2014/0216845 A1 Aug. 7, 2014

Related U.S. Application Data

(60) Continuation of application No. 13/797,127, filed on Mar. 12, 2013, now abandoned, which is a division of application No. 13/314,954, filed on Dec. 8, 2011, now Pat. No. 8,413,762.

(51) Int. Cl.
*E04B 1/82* (2006.01)
*E04B 1/84* (2006.01)
(Continued)

(52) U.S. Cl.
CPC . *B64C 1/40* (2013.01); *B29C 66/11* (2013.01); *B29C 66/1122* (2013.01); *B64C 1/00* (2013.01);
(Continued)

(58) Field of Classification Search
CPC .............. B32B 3/12; E04B 1/82; E04B 1/84; B64C 1/40; B64C 1/00; G10K 11/00; G10K 11/02; B29K 2105/04; B29C 65/00; B29C 66/11; B29C 66/1122; B29C 66/1142; B29C 66/43
USPC .......................... 181/292, 290, 294; 310/334
See application file for complete search history.

(56) References Cited

U.S. PATENT DOCUMENTS 4,523,122 A * 6/1985 Tone et al. .................... 310/334
4,686,409 A * 8/1987 Kaarmann et al. ............ 310/358
(Continued)

FOREIGN PATENT DOCUMENTS

WO 2013086155 A1 6/2013

OTHER PUBLICATIONS

U.S. Office Action issued Nov. 23, 2012 in U.S. Appl. No. 13/314,954.
(Continued)

*Primary Examiner* — David Warren
*Assistant Examiner* — Christina Russell
(74) *Attorney, Agent, or Firm* — Ingrassia, Fisher & Lorenz, P.C.

(57) ABSTRACT

Embodiments of thermal-acoustic sections for an aircraft for reducing noise along an acoustic path produced from an acoustic source are provided herein. The thermal-acoustic section comprises a first porous layer having a first characteristic acoustic impedance. A second porous layer is disposed adjacent to the first porous layer and has a second characteristic acoustic impedance that is greater than the first characteristic acoustic impedance. The thermal-acoustic section is configured to be positioned along the acoustic path such that at least a portion of the noise from the acoustic source is directed through the first porous layer to the second porous layer to promote absorption of the noise.

15 Claims, 2 Drawing Sheets

(51) Int. Cl.
| | |
|---|---|
| *E04B 2/02* | (2006.01) |
| *B32B 3/12* | (2006.01) |
| *B64C 1/40* | (2006.01) |
| *H02N 2/00* | (2006.01) |
| *B29C 65/00* | (2006.01) |
| *B64C 1/00* | (2006.01) |
| *G10K 11/00* | (2006.01) |
| *G10K 11/02* | (2006.01) |
| *B32B 5/26* | (2006.01) |
| *B32B 5/32* | (2006.01) |
| *B32B 7/02* | (2006.01) |
| *B29K 105/04* | (2006.01) |

(52) U.S. Cl.
CPC ............... *G10K 11/00* (2013.01); *B29C 66/43* (2013.01); *E04B 1/82* (2013.01); *E04B 1/84* (2013.01); *B29C 66/1142* (2013.01); *B32B 3/12* (2013.01); *B29C 65/00* (2013.01); *G10K 11/02* (2013.01); *B32B 5/26* (2013.01); *B32B 5/32* (2013.01); *B32B 7/02* (2013.01); *B29K 2105/04* (2013.01); *B32B 2250/02* (2013.01); *B32B 2250/03* (2013.01); *B32B 2250/04* (2013.01); *B32B 2250/05* (2013.01); *B32B 2250/20* (2013.01); *B32B 2250/22* (2013.01); *B32B 2266/0257* (2013.01); *B32B 2266/0285* (2013.01); *B32B 2266/06* (2013.01); *B32B 2307/102* (2013.01); *B32B 2307/718* (2013.01); *B32B 2605/18* (2013.01)

(56) References Cited

U.S. PATENT DOCUMENTS

| | | | | |
|---|---|---|---|---|
| 5,108,833 | A | * | 4/1992 | Noguchi et al. ........... 428/310.5 |
| 5,143,664 | A | * | 9/1992 | Noguchi et al. .............. 264/113 |
| 6,182,787 | B1 | | 2/2001 | Kraft et al. |
| 7,124,856 | B2 | * | 10/2006 | Kempton et al. ............. 181/284 |
| 7,537,818 | B2 | * | 5/2009 | Allison et al. ................. 428/95 |
| 8,413,762 | B1 | * | 4/2013 | Wang et al. ................... 181/292 |
| 2005/0023931 | A1 | * | 2/2005 | Bouche et al. ................ 310/327 |
| 2006/0093847 | A1 | * | 5/2006 | Hornick et al. ............... 428/523 |
| 2007/0182284 | A1 | * | 8/2007 | Bouche et al. ................ 310/327 |
| 2010/0043955 | A1 | * | 2/2010 | Hornick et al. ............... 156/182 |
| 2010/0148001 | A1 | * | 6/2010 | Hoetzeldt et al. ............. 244/1 N |
| 2010/0148003 | A1 | | 6/2010 | Verweyen ..................... 244/119 |
| 2011/0186380 | A1 | * | 8/2011 | Beauvilain et al. ........... 181/292 |
| 2012/0256048 | A1 | * | 10/2012 | Wang et al. ................... 244/1 N |
| 2014/0216845 | A1 | | 8/2014 | Wang et al. |

OTHER PUBLICATIONS

PCT Search Report and Written Opinion mailed Apr. 19, 2013 in PCT/US12/068195.
U.S. Office Action issued May 17, 2013 in U.S. Appl. No. 13/797,127.
The International Bureau of WIPO, Notification Concerning Transmittal of International Preliminary Report on Patentability for International Application No. PCT/US2012/068195 mailed Jun. 19, 2014.
Canadian Intellectual Property Office, Office Action for Canadian Patent Application No. 2,856,317, mailed Dec. 29, 2014.

\* cited by examiner

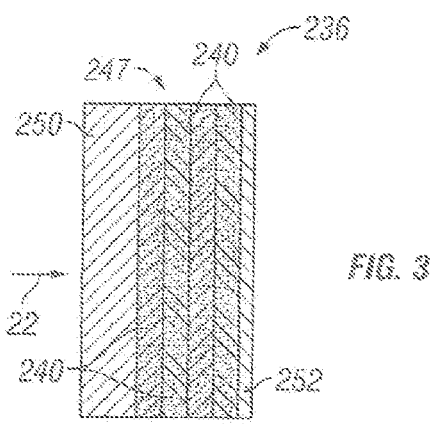
*FIG. 3*
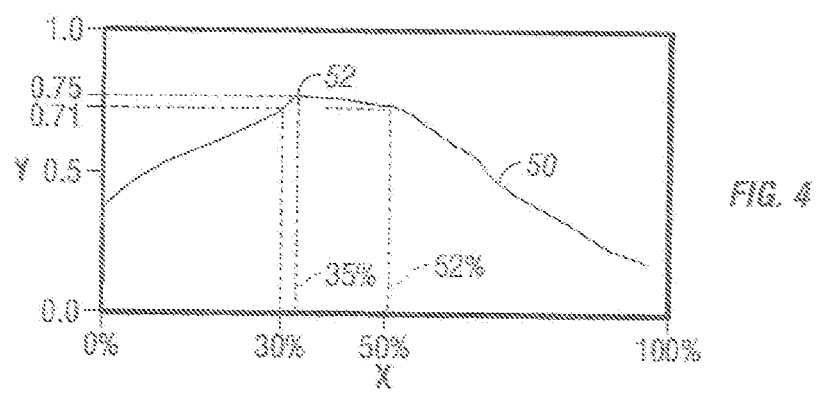
*FIG. 4*
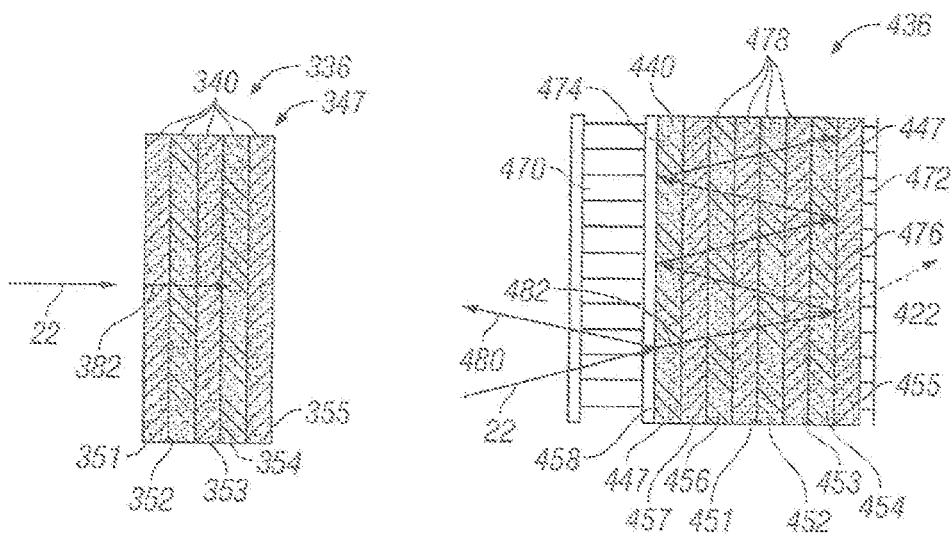
*FIG. 5*
*FIG. 6*

THERMAL-ACOUSTIC SECTIONS FOR AN AIRCRAFT

CROSS-REFERENCE TO RELATED APPLICATIONS

This application is a continuation application of U.S. application Ser. No. 13/797,127, filed Mar. 12, 2013, which is a divisional application of U.S. application Ser. No. 13/314,954, filed Dec. 8, 2011, which are hereby incorporated in their entirety by reference.

TECHNICAL FIELD

The present invention relates generally to noise reduction for an aircraft, and more particularly relates to thermal-acoustic sections that include multiple porous layers arranged together for reducing noise for the aircraft.

BACKGROUND

An Aircraft typically has various sections of their structure and/or interior cabin trim that incorporate thermal-acoustic packages for thermal insulation and reducing the noise that is transmitted into the cabin from outside of the fuselage, such as by the engines, the turbulent boundary layer over the fuselage, and the like, and that is directed inward to the aircraft cabin. For example, an aircraft with a metallic fuselage commonly has a layer of thermal-acoustic fibrous material interposingly positioned in the frame of the fuselage. The fibrous material helps to thermally insulate and reduce the noise passing through the fuselage to the aircraft cabin, providing a quieter, more comfortable and desirable environment for the passengers.

Recently, efforts to decrease the weight of an aircraft to improve fuel efficiency and lower emissions have led to the development of lower mass and higher stiffness aircraft structures, such as, for example, composite structures for the fuselage and the like. The lower mass and higher stiffness structures are structurally very efficient, but unfortunately result in a significant increase in the noise transmitted through the fuselage to the aircraft cabin. For instance, the noise level in an aircraft cabin enclosed in a composite fuselage resulting from outside noise can be about 10 dB or greater than the noise level in an aircraft cabin that is enclosed in a conventional metallic fuselage when both the composite and conventional fuselages utilize equivalent conventional thermal-acoustic packages.

Accordingly, it is desirable to provide a thermal-acoustic package for an aircraft with improved noise reducing efficacy. Moreover, it is desirable to provide a thermal-acoustic package for an aircraft that further reduces the noise transmitted through the fuselage into the aircraft cabin and the like. Furthermore, other desirable features and characteristics of the present invention will become apparent from the subsequent detailed description and the appended claims, taken in conjunction with the accompanying drawings and this background.

BRIEF SUMMARY

Thermal-acoustic sections for an aircraft for reducing noise are provided herein. In accordance with an exemplary embodiment, a thermal-acoustic section for an aircraft for reducing noise along an acoustic path produced from an acoustic source is provided. The thermal-acoustic section comprises a first porous layer having a first characteristic acoustic impedance. A second porous layer is disposed adjacent to the first porous layer and has a second characteristic acoustic impedance that is greater than the first characteristic acoustic impedance. The thermal-acoustic section is configured to be positioned along the acoustic path such that at least a portion of the noise is directed through the first porous layer to the second porous layer to promote absorption of the noise.

In accordance with another exemplary embodiment, a thermal-acoustic section for an aircraft for reducing noise along an acoustic path produced from an acoustic source is provided. The thermal-acoustic section comprises a plurality of juxtaposed porous layers forming a thermal-acoustic stack. The thermal-acoustic stack has a first outermost portion, a second outermost portion, and a central portion that is disposed between the first and second outermost portions. The thermal-acoustic stack is configured to be positioned along the acoustic path such that the noise from the acoustic source is incident to the first outermost portion. The first outermost portion has a first relatively high characteristic acoustic impedance that is effective to reflect a substantial portion of the noise away from the thermal-acoustic stack and to allow a transmitted portion of the noise to enter the thermal-acoustic stack. The thermal-acoustic stack has a gradually decreasing characteristic acoustic impedance from the first outermost portion to the central portion and a gradually increasing characteristic acoustic impedance from the central portion to the second outermost portion to improve the transmission loss of the thermal-acoustic stack.

In accordance with another exemplary embodiment, a thermal-acoustic section for an aircraft for reducing noise along an acoustic path produced from an acoustic source is provided. The thermal-acoustic section comprises a first porous layer and a second porous layer that is disposed adjacent to the first porous layer. The first porous layer is in a first compressed condition at a first percent compression such that the first porous layer has a first acoustic absorption coefficient that is about 95% or greater of a first maximum acoustic absorption value for the first porous layer over a first predetermined frequency range and/or the second porous layer is in a second compressed condition at a second percent compression such that the second porous layer has a second acoustic absorption coefficient that is about 95% or greater of a second maximum acoustic absorption value for the second porous layer over a second predetermined frequency range. The thermal-acoustic section is configured to be positioned along the acoustic path such that at least a portion of the noise is directed through the first porous layer to the second porous layer to promote absorption of the noise.

BRIEF DESCRIPTION OF THE DRAWINGS

The present invention will hereinafter be described in conjunction with the following drawing figures, wherein like numerals denote like elements, and wherein:

FIG. 3 is a sectional view of a thermal-acoustic section in accordance with an exemplary embodiment;

FIG. 4 is a graphical representation of acoustic absorption as a function of compression of a component porous layer used to form the thermal-acoustic section in accordance with the exemplary embodiment of FIG. 3;

FIG. 5 is a sectional view of a thermal-acoustic section in accordance with another exemplary embodiment; and FIG. 6 is a sectional view of a thermal-acoustic section in accordance with another exemplary embodiment.

DETAILED DESCRIPTION

Figure 1:
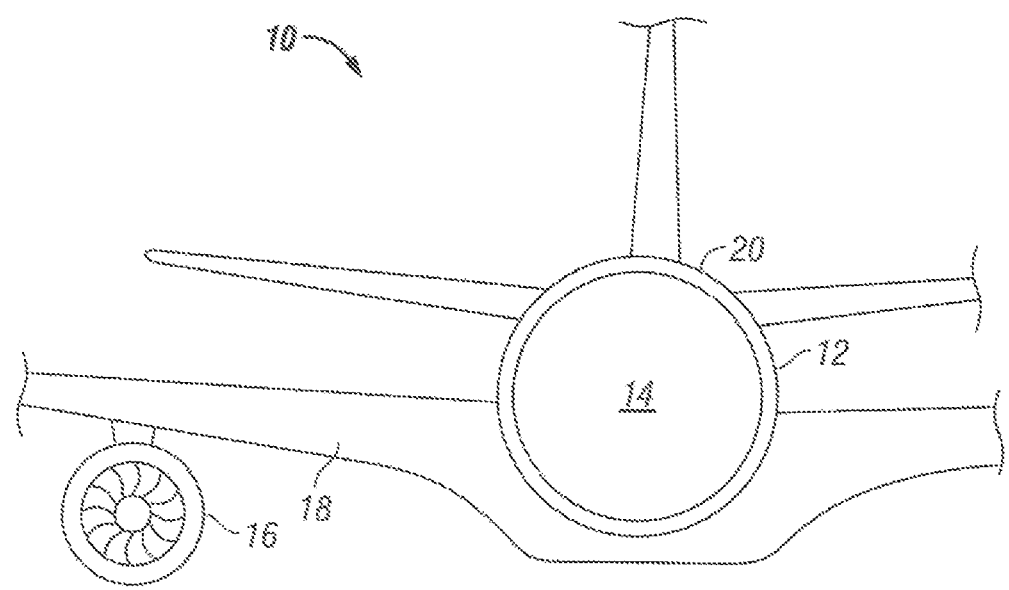
FIG. 1 is a partial sectional front view of a representative aircraft in accordance with an exemplary embodiment.

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to thermal-acoustic sections for an aircraft for reducing noise. The exemplary embodiments taught herein provide a thermal-acoustic section comprising a plurality of juxtaposed porous layers stacked together preferably in direct contact with each other to form a thermal-acoustic stack. The thermal-acoustic stack is positioned along an acoustic path, such as, for example, between an aircraft fuselage and an interior cabin panel to reduce the noise passing through the fuselage to the aircraft cabin. Alternatively, the thermal-acoustic stack can be arranged elsewhere in the aircraft to reduce undesirable noise e.g., absorb undesirable noise.

In an exemplary embodiment, the thermal-acoustic stack has a first outermost portion, a second outermost portion, and a central portion that is disposed between the first and second outermost portions. The thermal-acoustic stack is configured such that the noise passing along the acoustic path is incident to the first outermost portion, which has a relatively high characteristic acoustic impedance. As used herein, "characteristic acoustic impedance" is defined as a product of the density and the speed of sound for a homogeneous medium. For a porous material, the characteristic acoustic impedance is determined by several parameters, including density, flow resistivity, speed of sound, porosity, torturosity and the like. Any impedance mismatch at the interface between two materials causes a portion of the sound energy to reflect back to the incident sound field. The higher the impedance mismatch between the two materials, the more energy will be reflected and the less energy will get transmitted. If the first material has a higher acoustic impedance, the impedance mismatch at the interface between air and the first material causes a substantial portion of the incident noise to be reflected from the medium interface, allowing only a portion of the noise to be transmitted into the medium. Accordingly, a substantial portion of the noise passing along the acoustic path will be reflected off the interface of the first outermost portion away from the thermal-acoustic stack (e.g. reflected in a direction away from the aircraft cabin), allowing only a portion of noise to transmit into the thermal-acoustic stack.

The thermal-acoustic stack is configured to have a gradually decreasing characteristic acoustic impedance from the first outermost portion to the central portion and a gradually increasing characteristic acoustic impedance from the central portion to the second outermost portion. The gradual decrease and increase in characteristic acoustic impedance through the thermal-acoustic stack facilitates passage of the transmitted portion of noise from the first outermost portion through the central portion to the second outermost portion. Further, the lower characteristic acoustic impedance of the central portion means that the buildup is more efficient at trapping the sound energy inside the thermal-acoustic section so that the sound energy is absorbed more efficiently. In an exemplary embodiment, the second outermost portion has a second relatively high characteristic acoustic impedance that preferably causes the transmitted portion of noise that reaches the second outermost portion to be reflected back towards the first outermost portion. As such, the transmitted portion of noise again passes through the central portion, thereby further absorbing and reducing the noise.

In an exemplary embodiment, the plurality of juxtaposed porous layers include a first porous layer disposed along the first outermost portion, a second porous layer disposed along the second outermost portion, and a third porous layer disposed along the central portion. The first, second, and/or third porous layer(s) are compressed to a corresponding predetermined percent compression such that the acoustic absorption of the compressed layer(s) are substantially maximized. Determination of maximized acoustic absorption values of porous layers is described in further detail below. By increasing the acoustic absorption characteristics of the first, second, and/or third porous layers, the noise absorbing efficacy of the thermal-acoustic stack is improved, enhancing the absorption and reduction of the transmitted portion of noise as it passes through the thermal-acoustic stack. Without being limited by theory, it is believed that compressing the porous layer(s) to a corresponding predetermined percent compression increases the complexity of the torturous air pathways throughout the porous layer(s). Much of the noise passing through the porous layer(s) preferably advances along the torturous air pathways. Therefore, increasing the complexity of the torturous air pathways essentially increases the length of the air pathways, causing the transmitted portion of noise to travel a greater distance through the thermal-acoustic stack, effectively improving the absorption and reduction of the noise.

Referring to FIG. 1, a partial sectional front view of an aircraft 10 in accordance with an exemplary embodiment is provided. The aircraft 10 has a fuselage 12 that encloses an aircraft cabin 14. The fuselage 12 may be a metallic fuselage, a composite fuselage, or the like. Adjacent to the fuselage 12 is an engine 16 that is disposed along a wing 18 for driving the aircraft 10. During operation, noise is produced outside of the fuselage 12, such as, for example, by the engine 16, turbulent air flowing over an outer surface 20 of the fuselage 12, and the like.

Figure 2:
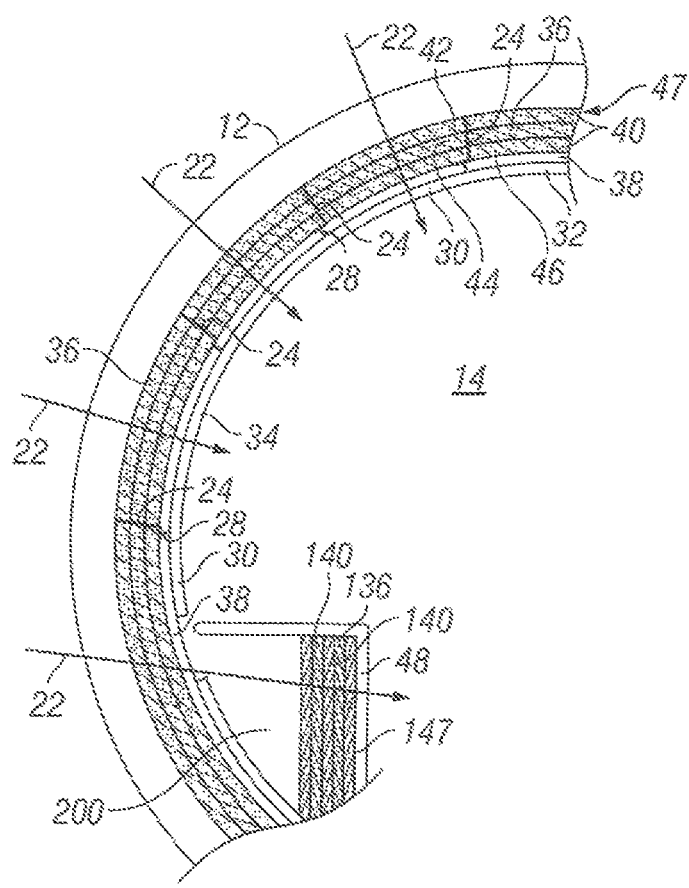
FIG. 2 is an enlarged partial sectional view of the aircraft depicted in FIG. 1 including a thermal-acoustic section interposingly positioned in the fuselage buildup.

As illustrated in FIG. 2, in an exemplary embodiment, a portion of the noise generated outside of the fuselage, travels through the fuselage 12 toward the aircraft cabin 14 along acoustic paths indicated by single headed arrows 22. In this embodiment, the fuselage 12 includes a plurality of frames 24. Isolators 28 are used to attach interior cabin panels 30, such as a headliners 32, closeout panels 34, and the like to the frames 24. A thermal-acoustic section 36 is positioned between the frames 24 of the fuselage 12 and the interior cabin panels 30. Between the thermal-acoustic section 36 and the interior cabin panels 30 is an acoustic layer 38, which for example may be made from an elastomer or the like, for blocking noise.

The thermal-acoustic section 36 has a plurality of juxtaposed porous layers 40 including an outer porous layer 42, an intermediate porous layer 44, and an inner porous layer 46 that are stacked together to form a thermal-acoustic stack 47. Although the thermal-acoustic stack 47 is shown as having three porous layers, it will be appreciated that a thermal-acoustic stack may include more than three porous layers or less than three porous layers but will have at least two porous layers. For example, the thermal-acoustic section 136 that is disposed between the acoustic space 200 and a dado panel 48, which is an interior cabin panel 30 typically positioned below an armrest of a passenger seat (not shown), is shown as having a thermal-acoustic stack 147 formed from five porous layers 140.

Some non-limiting examples of materials used for the porous layers 40 include, but are not limited to, open-cell foam such as polyamide foam, melamine foam, and the like; fibrous materials such as continuous fiber mats or blankets, fibers bonded with resin, and the like; felt and the like; and combinations thereof. Preferably, each of the porous layers 40 has a plurality of torturous air passageways formed therein, and has a porosity of about 85 volume percent (vol. %) or greater, more preferably about 95 vol. % or greater, and most preferably about 97 vol. % or greater.

Referring to FIG. 3, a thermal-acoustic section 236 has a thermal-acoustic stack 247 that includes a plurality of juxtaposed porous layers 240 that are disposed between a first outer structure 250 and a second outer structure 252. At least one of the porous layers 240, and preferably more than one of the porous layers 240, is in a compressed condition to preferably maximize the acoustic absorption efficacy of the layer(s).

In particular, FIG. 4 graphically represents the acoustic absorption as a function of compression of a porous layer in accordance with an exemplary embodiment. The vertical axis (Y) represents the acoustic absorption coefficient of the porous layer, which is a weighted average over a selected frequency range, and the horizontal axis (X) represents the percent compression of the porous layer. In this example, the selected frequency range is that used to calculate the Speech Interference Level (SIL) including the third octave band as is well known in the art, and covers the frequency range of from about 800 Hz to about 5,000 Hz third octave bands. The acoustic absorption coefficient ranges from 0.0 to 1.0 in which 1.0 is an ideal acoustic absorber. The percent compression of the porous layer ranges from 0 to 100%. A curve 50 graphically represents an example of the relationship of acoustic absorption of the porous layer as a function of compression. However, it is to be appreciated that the curve 50 will be different for different grades and types of porous layers. As illustrated, the porous layer has a maximum acoustic absorption value 52 of about 0.75 with a corresponding percent compression of about 35%. Additionally, 95% of the maximum acoustic absorption value 52 is about 0.71 with corresponding compressions of 30% and 52%.

Referring to FIGS. 3 and 4, in an exemplary embodiment, at least one of the porous layers 240 is in a compressed condition at a percent compression such that the porous layer(s) has an acoustic absorption coefficient that is about 95% or greater, preferably about 97% or greater, and most preferably about 99% or greater, of the maximum acoustic absorption value 52 over a selected frequency range. For example and as illustrated in FIG. 4, if the curve 50 represented the acoustic absorption of at least one of the porous layers 240 over the selected frequency range (e.g. SIL), the layer(s) would be in a compressed condition of from about 30 to about 52% compression for an acoustic absorption coefficient that is about 95% or greater of the maximum acoustic absorption value 52 of about 0.75.

Referring to FIG. 5, a thermal-acoustic section 336 includes a plurality of juxtaposed porous layers 340 stacked together to form a thermal-acoustic stack 347 that is configured for enhanced acoustic absorption. The plurality of juxtaposed porous layers 340 include a first porous layer 351, a second porous layer 352, a third porous layer 353, a fourth porous layer 354, and a fifth porous layer 355. One or more of the plurality of porous layers 340 may be in a compressed condition as discussed above. The thermal-acoustic stack 347 is positioned such that the noise passing along the acoustic path 22 advances respectively through the first porous layer 351, the second porous layer 352, the third porous layer 353, the fourth porous layer 354, and the fifth porous layer 355.

In an exemplary embodiment, the thermal-acoustic stack 347 is arranged such that the characteristic acoustic impedance gradually increases from the first porous layer 351 through the thermal-acoustic stack 347 to the fifth porous layer 355. As used herein, "gradually increasing characteristic acoustic impedance" is to be understood to mean that the characteristic acoustic impedance is higher for each adjacent layer in the defined direction. For example, the second porous layer 352 has a higher characteristic acoustic impedance than the first porous layer 351, the third porous layer 353 has a higher characteristic acoustic impedance than the second porous layer 352, the fourth porous layer 354 has a higher characteristic acoustic impedance than the third porous layer 353, and the fifth porous layer 355 has a higher characteristic acoustic impedance than the fourth porous layer 354. Preferably, the first porous layer 351 has a relatively low characteristic acoustic impedance of below 5,000 Pa·s/m, more preferably from about 400 to about 500 Pa·s/m, which is approximately the characteristic acoustic impedance of air in the aircraft interior cabin. The relatively low characteristic acoustic impedance of the first porous layer 351 helps to minimize the amount of noise reflected from the first porous layer 351, allowing a substantial transmitted portion of noise 382 to advance through the thermal-acoustic stack 347 to be absorbed.

Referring to FIG. 6, in another exemplary embodiment, a thermal-acoustic section 436 includes a plurality of juxtaposed porous layers 440 stacked together to form a thermal-acoustic stack 447 that is configured for enhanced sound transmission loss. The plurality of juxtaposed porous layers 440 includes a first porous layer 451, a second porous layer 452, a third porous layer 453, a fourth porous layer 454, and a fifth porous layer 455 that are configured for enhanced absorption as discussed in the foregoing paragraphs in relation to the thermal-acoustic stack 347 illustrated in FIG. 5. Additionally, the plurality of juxtaposed porous layers 440 includes a sixth porous layer 456, a seventh porous layer 457, and an eighth porous layer 458. One or more of the plurality of juxtaposed porous layers 440 may be in a compressed condition as discussed above.

In a specific example of this embodiment, the thermal-acoustic section 436 is disposed between a first outer structure 470 and a second outer structure 472, which are shown as composite structures. It is to be understood, however, that the first and/or second outer structures 470 and 472 may be metal structures, plastic structures, or otherwise. The eighth porous layer 458 is disposed along a first outer most portion 474 of the thermal-acoustic stack 447 and the fifth porous layer 455 is disposed along a second outermost portion 476 of the thermal-acoustic stack 447. As illustrated, a central portion 478 of the thermal-acoustic stack 447 includes at least the first and second porous layers 451 and 452.

The thermal-acoustic stack 447 is positioned such that noise passing along the acoustic path 22 is incident to the first outermost portion 474. In an exemplary embodiment, the first outermost portion 474 has a first relatively high characteristic acoustic impedance such that a substantial portion of noise 480 is reflected away from the thermal-acoustic stack 447, allowing only a transmitted portion of noise 482 to enter the thermal-acoustic stack 447. Preferably, the first characteristic acoustic impedance of the first outermost portion 474 is about 250,000 Pa·s/m or greater, more preferably of about 350,000 Pa·s/m or greater, and most preferably of about 500,000 Pa·s/m or greater.

The thermal-acoustic stack 447 has a gradually decreasing characteristic acoustic impedance from the first outermost portion 474 to the central portion 478 and a gradually increasing characteristic acoustic impedance from the central portion 478 to the second outermost portion 476. As used herein, "gradually decreasing characteristic acoustic impedance" is to be understood to mean that the characteristic acoustic impedance is lower for each adjacent layer in a defined direction. In particular, the characteristic acoustic impedance of the seventh porous layer 457 is lower than the characteristic acoustic impedance of the eighth porous layer 458, the characteristic acoustic impedance of the sixth porous layer 456 is lower than the characteristic acoustic impedance of the seventh porous layer 457, and so forth. Likewise and as explained above, the first characteristic acoustic impedance of the first porous layer 451 is lower than the second characteristic acoustic impedance of the second porous layer 452, and so forth. As such, the gradual decrease and increase in the characteristic acoustic impedance through the thermal-acoustic stack 447 facilitates trapping the noise energy between the first and second outer structures 470 and 472 and improves the absorption of the thermal-acoustic stack 447 as the sound energy bounces between the first and second outer structures 470 and 472.

In an exemplary embodiment, the second outermost portion 476 has a second relatively high characteristic acoustic impedance such that the transmitted portion of noise 482 that reaches the second outermost portion 476 is substantially reflected back towards the first outermost portion 474 to be further absorbed and repeatedly reflected within the thermal-acoustic stack 447, thereby further reducing the noise. Preferably, the second characteristic acoustic impedance of the second outermost portion 476 is about 250,000 Pa·s/m or greater, more preferably of about 350,000 Pa·s/m or greater, and most preferably of about 500,000 Pa·s/m or greater. By reflecting a substantial portion of noise 482 away from the thermal acoustic stack 447, allowing only a transmitted portion of noise 482 to enter the thermal-acoustic stack 447, and substantially absorbing the transmitted portion of noise 482 in the thermal-acoustic stack 447 by reflecting the noise back and forth between the first and second outermost portions 474 and 476 and through the central portion 478, the transmitted portion of noise 422 exiting the thermal-acoustic stack 447 is substantially reduced, thereby improving the transmission loss of noise through the thermal-acoustic stack 447.

In an exemplary embodiment, the aerial weight (weight per unit area) of the second, third, fourth, and fifth porous layers 452-455 in the direction towards the second outermost portion 476 increases progressively for each of the layers, and the aerial weight of the sixth, seventh, and eighth porous layers 456-458 in a direction towards the first outermost portion 474 increases progressively for each of the layers. In this regard, the weight distribution may be centered about one of the center portion porous layers having the lowest characteristic impedance (e.g. the first porous layer 451) and be more balanced from the first outer structure 470 to the second outer structure 472. That is, if the aerial weight of the first outer structure 470 is greater than the aerial weight of the second outer structure 472 (e.g. aerial weight of the fuselage is about 3 times higher than that of the interior cabin closeout panel), the aerial weight of each of the second, third, fourth, and fifth porous layers 452-455 in the direction towards the second outermost portion 476 will progressively increase and the combined aerial weight of the porous layers 452-455 will be greater than the combined aerial weight of the porous layers 456-458, which for each of the layers 456-458 the aerial weight progressively increases in a direction towards the first outermost portion 474. The inventors have found that by balancing the weight about the central portion porous layer that has the lowest characteristic acoustic impedance, the transmission loss of noise through the thermal-acoustic section 436 is further enhanced.

Accordingly, thermal-acoustic sections for aircraft for reducing noise have been described. The various embodiments comprise a plurality of juxtaposed porous layers arranged in a thermal-acoustic stack according to characteristic acoustic impedance, percent compression, aerial weight, or combinations thereof to enhance the absorption efficacy and/or transmission loss of noise.

While at exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thermal-acoustic section for an aircraft for reducing noise along an acoustic path produced from an acoustic source, the thermal-acoustic section comprising:
a plurality of juxtaposed porous layers forming a thermal-acoustic stack that has a first outermost portion, a second outermost portion, and a central portion that is disposed between the first and second outermost portions, wherein the thermal-acoustic stack is configured to be positioned along the acoustic path such that the noise from the acoustic source is incident to the first outermost portion, and wherein the first outermost portion has a first relatively high characteristic acoustic impedance that is effective to reflect a substantial portion of the noise away from the thermal-acoustic stack and to allow a transmitted portion of the noise to enter the thermal-acoustic stack, and wherein the thermal-acoustic stack has a gradually decreasing characteristic acoustic impedance from the first outermost portion to the central portion and a gradually increasing characteristic acoustic impedance from the central portion to the second outermost portion to promote transmission loss of the transmitted portion of the noise through the thermal-acoustic stack.

2. The thermal-acoustic section of claim 1, wherein the plurality of juxtaposed porous layers include a first porous layer disposed along the first outermost portion, a second porous layer disposed along the second outermost portion, and a third porous layer disposed along the central portion, and wherein the first porous layer has a first characteristic acoustic impedance, the second porous layer has a second characteristic acoustic impedance, and the third porous layer has a third characteristic acoustic impedance that is less than the first and second characteristic acoustic impedance.

3. The thermal-acoustic section of claim 2, wherein the first porous layer is in a first compressed condition at a first percent compression such that the first porous layer has a first acoustic absorption coefficient that is about 95% or greater of a first maximum acoustic absorption value for the first porous layer over a first predetermined frequency range, the second porous layer is in a second compressed condition at a second percent compression such that the second porous layer has a second acoustic absorption coefficient that is about 95% or greater of a second maximum acoustic absorption value for the second porous layer over a second predetermined frequency range, and/or the third porous layer is in a third compressed condition at a third percent compression such that the third porous layer has a third acoustic absorption coefficient that is about 95% or greater of a third maximum acoustic absorption value for the third porous layer over a third predetermined frequency range.

4. The thermal-acoustic section of claim 2, wherein the first porous layer has a first aerial weight, the second porous layer has a second aerial weight greater than the first aerial weight, and the third porous layer has a third aerial weight that is less than the second aerial weight.

5. The thermal-acoustic section of claim 2, wherein the first and second porous layers have a porosity of about 85 vol. % or greater.

6. The thermal-acoustic section of claim 2, wherein the first and second porous layers each comprise a material selected from the group consisting of open-cell foam, felt, fibers, fibers bonded with resin, and combinations thereof.

7. The thermal-acoustic section of claim 1, wherein the first relatively high characteristic acoustic impedance is about 250,000 Pa·s/m or greater.

8. The thermal-acoustic section of claim 1, wherein the first relatively high characteristic acoustic impedance is about 350,000 Pa·s/m or greater.

9. The thermal-acoustic section of claim 1, wherein the first relatively high characteristic acoustic impedance is about 500,000 Pa·s/m or greater.

10. The thermal-acoustic section of claim 1, wherein the second outermost portion has a second relatively high characteristic acoustic impedance that is effective to reflect at least a portion of the transmitted portion of the noise back through the thermal-acoustic stack.

11. The thermal-acoustic section of claim 10, wherein the second relatively high characteristic acoustic impedance is about 250,000 Pa·s/m or greater.

12. The thermal-acoustic section of claim 10, wherein the second relatively high characteristic acoustic impedance is about 350,000 Pa·s/m or greater.

13. The thermal-acoustic section of claim 10, wherein the second relatively high characteristic acoustic impedance is about 500,000 Pa·s/m or greater.

14. The thermal-acoustic section of claim 1, further comprising:
a first outer structure; and
a second outer structure, wherein the thermal-acoustic stack is interposed between the first and second outer structures such that the first outer structure is disposed adjacent to the first outermost portion and the second outer structure is disposed adjacent to the second outermost portion, and wherein the first outer structure is a fuselage or a panel attached to the fuselage, and the second outer structure is a closeout panel, a dado panel, a headliner, an acoustic layer, or an interior cabin panel.

15. A thermal-acoustic section for an aircraft for reducing noise along an acoustic path produced from an acoustic source, the thermal-acoustic section comprising:
a first porous layer; and
a second porous layer disposed adjacent to the first porous layer, wherein the first porous layer is in a first compressed condition at a first percent compression such that the first porous layer has a first acoustic absorption coefficient that is about 95% or greater of a first maximum acoustic absorption value for the first porous layer over a first predetermined frequency range and/or the second porous layer is in a second compressed condition at a second percent compression such that the second porous layer has a second acoustic absorption coefficient that is about 95% or greater of a second maximum acoustic absorption value for the second porous layer over a second predetermined frequency range, and wherein the thermal-acoustic section is configured to be positioned along the acoustic path such that at least a portion of the noise is directed through the first porous layer to the second porous layer to promote absorption of the noise.

* * * * *